(12) United States Patent
Scarbrough et al.

(10) Patent No.: US 6,831,787 B1
(45) Date of Patent: Dec. 14, 2004

(54) PROTECTED LENTICULAR PRODUCT

(75) Inventors: Scott J. Scarbrough, Libertyville, IL (US); Daniel C. Faul, West Bend, WI (US)

(73) Assignee: Serigraph, Inc., West Bend, WI (US)

( * ) Notice: Subject to any disclaimer, the term of this patent is extended or adjusted under 35 U.S.C. 154(b) by 0 days.

(21) Appl. No.: 10/325,065

(22) Filed: Dec. 20, 2002

(51) Int. Cl.[7] ............................................. G02B 27/10
(52) U.S. Cl. ...................... 359/622; 359/619; 359/620; 359/621
(58) Field of Search ............................... 359/599, 707, 359/454–456, 619–624, 626, 628; 369/64, 95, 112; 40/436, 453, 427; 349/64, 95, 112

(56) References Cited

U.S. PATENT DOCUMENTS 5,353,133 A * 10/1994 Bernkopf ........................ 349/5
5,359,454 A * 10/1994 Steenblik et al. ............ 359/463
5,494,445 A * 2/1996 Sekiguchi et al. ........... 434/365

* cited by examiner

Primary Examiner—Hung Xuan Dang
Assistant Examiner—Joseph Martinez
(74) Attorney, Agent, or Firm—Andrus, Sceales, Starke & Sawall, LLC

(57) ABSTRACT

A protected lenticular product includes a lenticular substrate having an index of refraction $N_L$, the substrate having a lenticular surface with a plurality of peaks and valleys forming a plurality of respective lenticule lenses. An optical medium is provided on the lenticular surface, the medium having an index of refraction $N_C$ substantially less than $N_L$.

3 Claims, 5 Drawing Sheets

PROTECTED LENTICULAR PRODUCT

BACKGROUND AND SUMMARY

The invention relates to printed articles, and more particularly to lenticular printed articles.

Lenticular printed articles are known in the art, for example trading cards, greeting cards, signs, posters, labels, decals, book covers, decorative panels, name plates, and the like. Three dimensional or multiple image graphic design is provided by printing multiple interlaced images, and viewing same through a lenticular substrate. The images are printed on a sheet behind the lenticular substrate, or are printed on the reverse or second side (side facing away from the viewer) of the lenticular substrate.

A lenticular substrate has a lenticular surface with a plurality of peaks and valleys forming a plurality of respective lenticule lenses. For example, a typical lenticular substrate may be 17 mil thick PETG, polyethylene teraphalate glycol, with 75 lpi, lenses per inch. The lenticular surface faces the viewer, and the plurality of peaks and valleys forming the lenticule lenses can be visually seen as a plurality of thin parallel ribs. The ribs can be tactilely felt, for example by running one's fingers transversely across the ribs.

The present invention provides a coating or laminate over the lenticules, giving the lenticular product additional chemical and/or mechanical resistance, and/or providing a smooth surface for subsequent printing or decorating, and/or providing a surface coefficient of friction for non-skid floor graphic applications, while maintaining the lenticular effect of three dimensional and/or multiple image viewing.

DETAILED DESCRIPTION OF THE INVENTION

Figure 1:
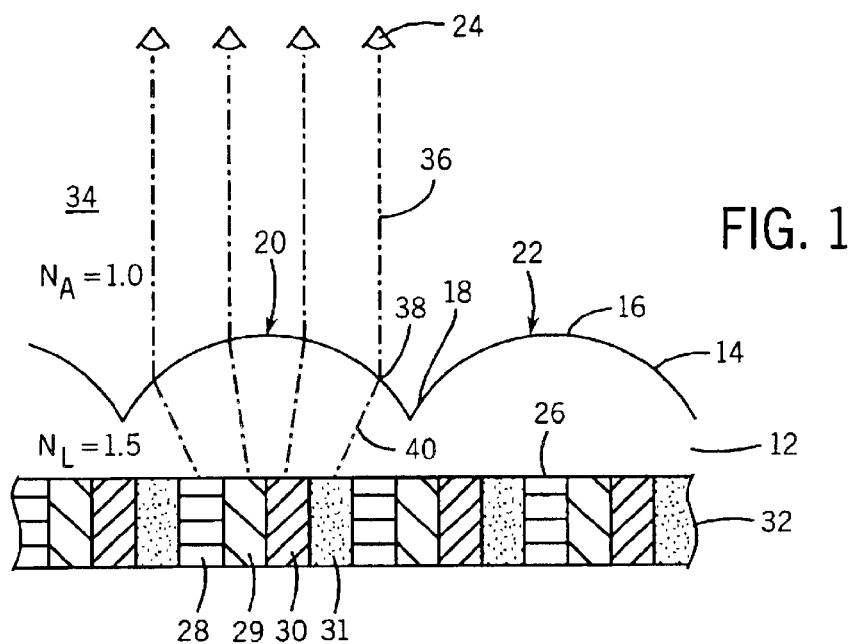
FIG. 1 is an enlarged sectional side view of the lenticular substrate as known in the prior art.
Figure 2:
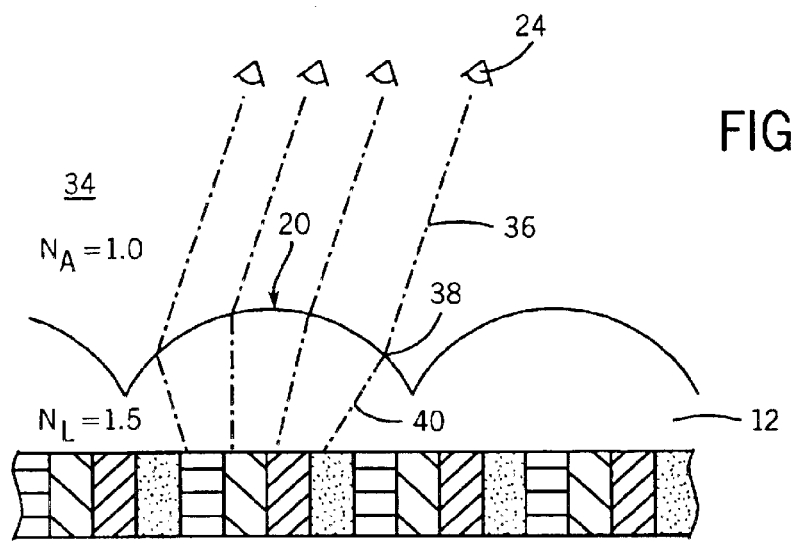
FIG. 2 is like FIG. 1 and shows a different viewing angle.

FIG. 1 shows a lenticular substrate 12 having a lenticular surface 14 with a plurality of peaks 16 and valleys 18 forming a plurality of respective lenticule lenses 20. The lenses are on the first surface or side 22, which is the side facing the viewer, as schematically shown at eyeball 24. Second side or surface 26 is the side facing away from the viewer and has a plurality of images printed thereon in interlaced manner, for example images 28, 29, 30, 31, as is known. Alternatively, the images are printed on a sheet 32 affixed to second surface 26, all as is known. The three dimensional or multiple image lenticular effect requires: a) the magnification provided by the curvature of lens 20; and b) the bending of light rays by refraction at the lens surface as the light rays travel from the faster optical medium of the observation area 34 (typically air having an index of refraction $N_A$ of 1.0) to the slower optical medium of the lenticular substrate 12 (typically vinyl, polycarbonate or polyester having an index of refraction $N_L$ of about 1.5), and vice versa for the return path from the images 28–31 through substrate 12 back into observation area 34. For example, light ray 36 in air in observation area 34 strikes lens surface 20 at interface point 38 and is bent toward the normal as shown at ray 40, according to Snell's Law and the optics of refraction. The light ray bends toward the normal at interface 38 because it is traveling from a faster medium (air having an index of refraction $N_A$ of 1.0) to a slower medium (substrate 12 having an index of refraction $N_L$ of 1.5). In the reverse or opposite return path, light ray 40 in substrate 12 strikes interface 38 and bends away from the normal to follow path 36, because the light ray is traveling from a slower optical medium ($N_L$=1.5) to a faster optical medium ($N_A$=1.0). FIG. 2 shows a different viewing angle, and the same noted optical principles apply.

Figure 3:
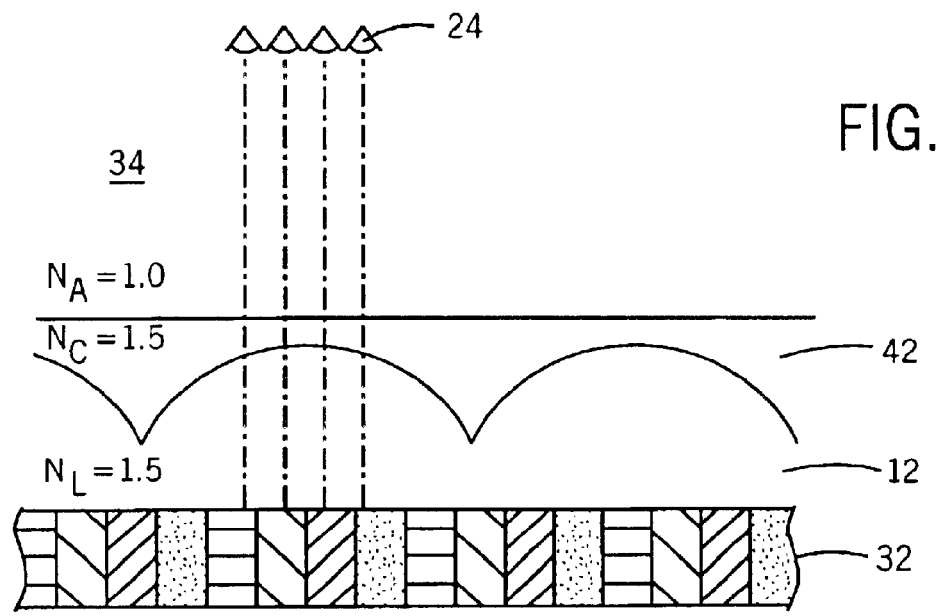
FIG. 3 is like FIG. 1 and illustrates a coating layer on the substrate.
Figure 4:
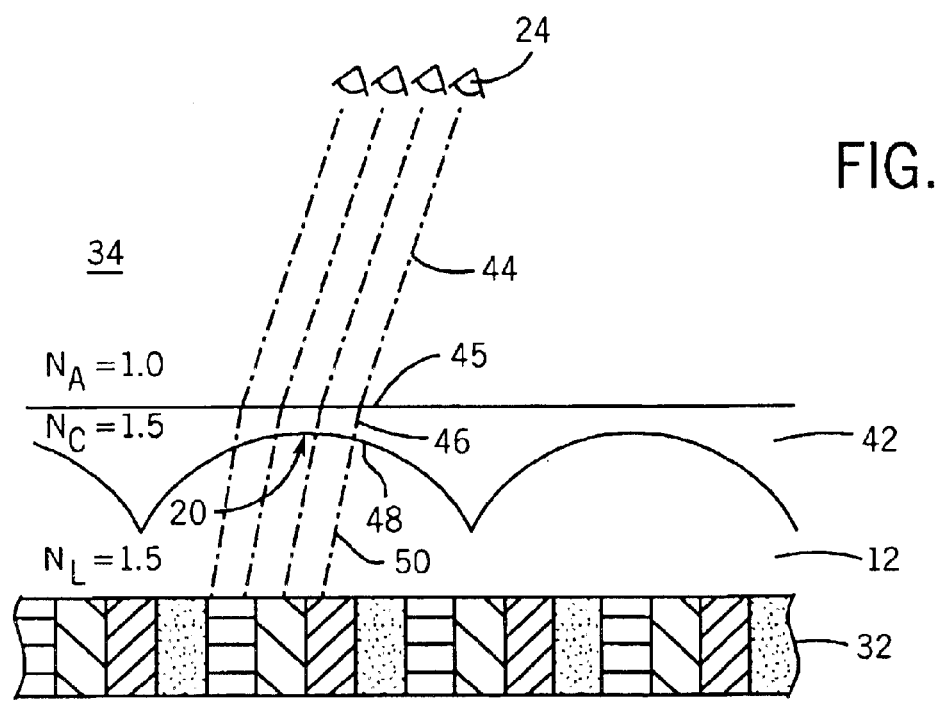
FIG. 4 is like FIG. 3 and shows a different viewing angle.

FIGS. 3 and 4 show the substrate of FIGS. 1 and 2 and use like reference numerals therefrom where appropriate to facilitate understanding. In FIGS. 3 and 4, a protective coating layer 42 has been added, having an index of refraction $N_C$ substantially the same as that of substrate 12, namely 1.5. As shown in FIG. 4, light ray 44 striking interface 46 is bent toward the normal as shown at 45, because the light ray is going from the faster medium of air (index of refraction $N_A$=1.0) to the slower medium of coating layer 42 (index of refraction $N_C$=1.5). Light ray 46 then continues and strikes substrate 12 at interface 48 and travels through the substrate as shown at light ray 50. There is no bending of light ray 46 as it enters substrate 12 at interface 48 because the light ray is not going to a faster or slower medium, i.e., there is no change in optical speed at interface 48, and hence no refraction. That is, light ray 46 travels from optical medium 42 having an index of refraction of 1.5 to optical medium 12 also having an index of refraction of 1.5, and hence there is no refractive bending of light ray 46 as it enters substrate 12, and vice versa for the return path of the light ray. Because of the non-bending of the light rays at lens surface 20, there is no magnification nor lenticular effect.

Figure 5:
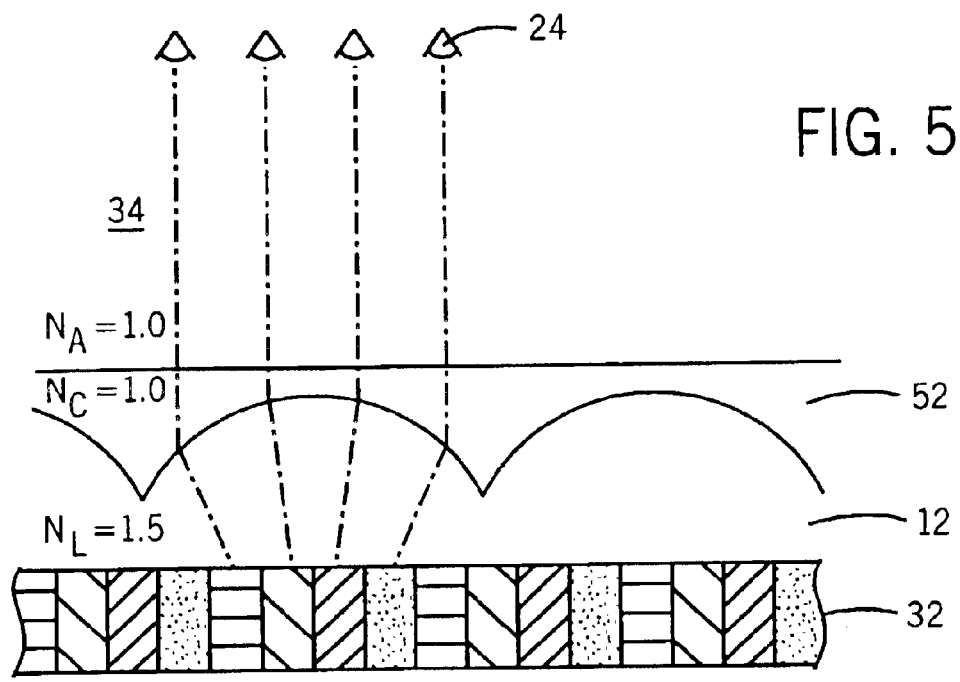
FIG. 5 is like FIG. 3 and shows a protected lenticular product in accordance with the invention.
Figure 6:
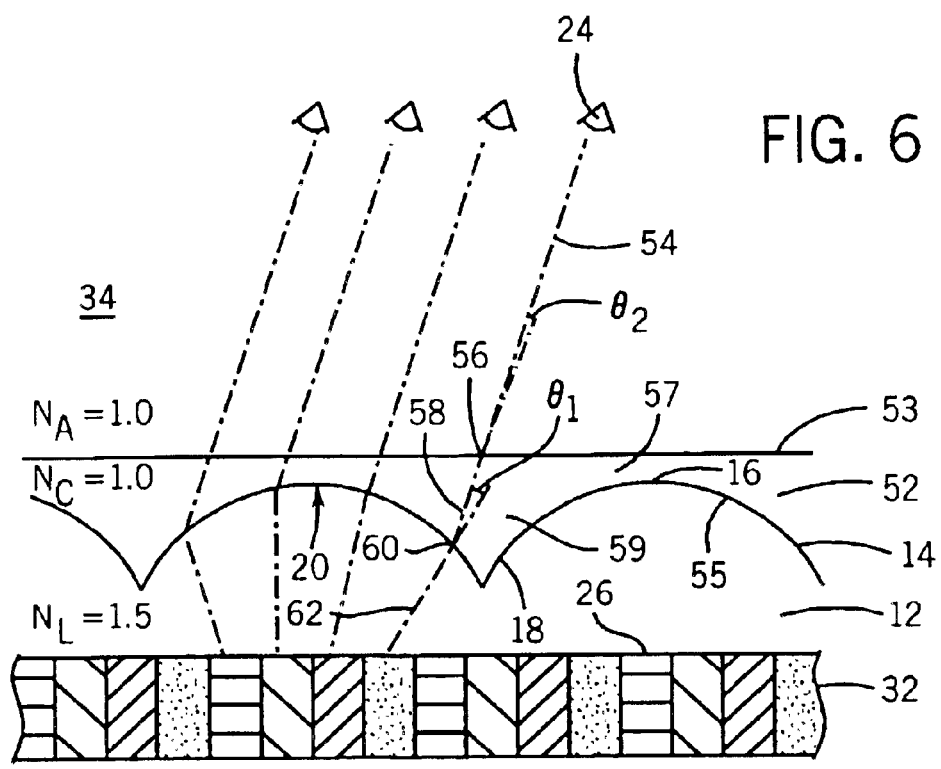
FIG. 6 is like FIG. 5 and shows a different viewing angle.

FIGS. 5 and 6 illustrate the present invention and use like reference numerals from above where appropriate to facilitate understanding. An optical medium coating layer 52 is provided on substrate 12. Unlike coating layer 42 of FIGS. 3 and 4, the coating layer 52 in FIGS. 5 and 6 is selected to be of higher optical speed medium, preferably 1.0, though at least substantially closer to 1.0 than to 1.5. That is, the index of refraction of layer 52 is substantially closer to the index of refraction of the viewing area 34 (e.g. air) than to the index of refraction of the lenticular substrate 12. As shown in FIG. 6, as light ray 54 enters coating layer 52 at interface 56 and continues at 58, FIG. 6, there will be no bending of the light ray if optical mediums 34 and 52 are of the same speed, e.g. the index of refraction $N_A$ of the observation area is 1.0 and the index of refraction $N_C$ of layer 52 are both 1.0. If the optical speeds of mediums 34 and 52 are only slightly different, e.g. the index of refraction of layer 52 is only slightly greater than 1.0, then there is only slight bending of light ray 54 at interface 56 as the light ray continues at 58. When light ray 58 strikes interface 60 of lenticule lens 20, the light ray bends by refraction according to Snell's Law and continues as shown at 62. The bending at interface 60 is due to the difference in optical speeds of mediums 52 and 12, the greater the difference the greater the bending. The bending at interface 60 as light ray 58 leaves coating layer 52 and enters substrate 12 is significant because it overcomes the problem illustrated in FIG. 4 where there is no bending of light ray 46 at interface 48 as it continues at 50 because mediums 42 and 12 are of the same optical speed, i.e. have the same index of refraction $N_C=N_L=1.5$. In contrast, in FIG. 6, mediums 52 and 12 have different optical speeds, namely coating layer 52 has an index of refraction $N_C=1.0$, and substrate 12 has an index of refraction $N_L=1.5$. Coating layer 52 need not have an index of refraction $N_C=1.0$, however, the closer $N_C$ is to $N_A$, and the farther away $N_C$ is from $N_L$, the better the magnification and lenticular effect. Hence, it is preferred that $N_C$ is substantially less than $N_L$. It is further preferred that $N_C$ is substantially closer to $N_A$ than to $N_L$.

Optical medium coating layer 52 has a first surface 53 facing observation area 34, and a second opposite surface 55 interfaced to peaks and valleys 16 and 18 of substrate 12. Second surface 55 of optical medium coating layer 52 is a mirror image of lenticular surface 14 and conforms to the peaks and valleys of the lenticular surface. First surface 53 of layer 52 is planar. Coating 52 thus has thin portions 57 at peaks 16 of lenticular surface 14, and has thick portions 59 filling valleys 18 of lenticular surface 14. In the embodiment in FIGS. 5 and 6, optical medium 52 is a coating, and first surface 53 is interfaced to observation area 34. Light rays passing from lenticular substrate 12 into coating 52 are bent at an angle $\theta_1$ at the interface 60 thereof. Light rays passing from coating 52 into observation are 34 are bent at an angle $\theta_2$ at the interface 56 thereof. $N_C$ is substantially closer to $N_A$ than to $N_L$ such that $\theta_1$ is substantially greater than $\theta_2$. Preferably, $N_C=N_A$, in which case $\theta_2$ is zero.

Figure 7:
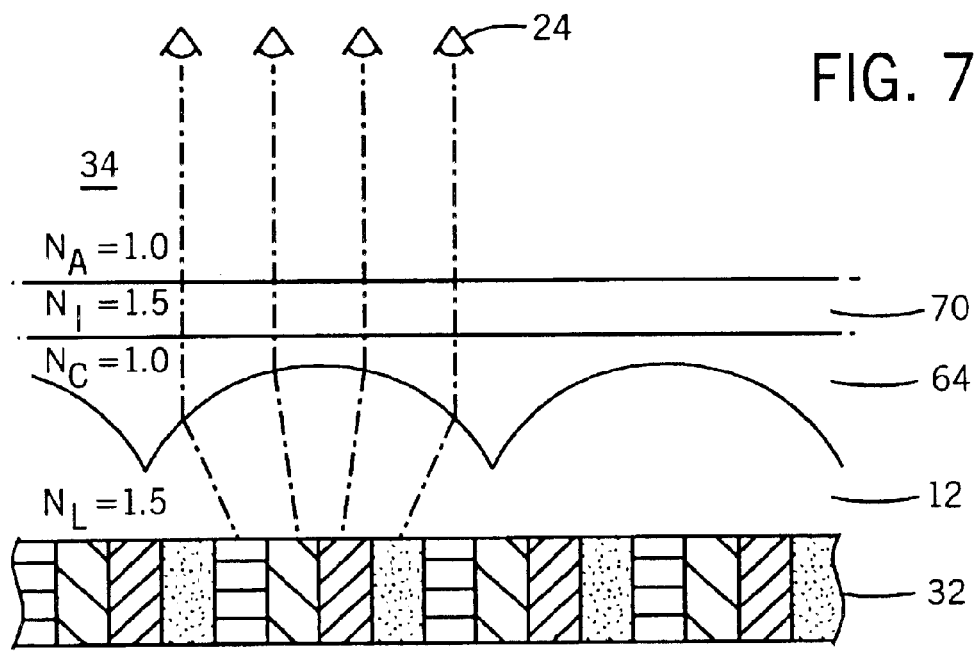
FIG. 7 is like FIG. 5 and shows a further embodiment.
Figure 8:
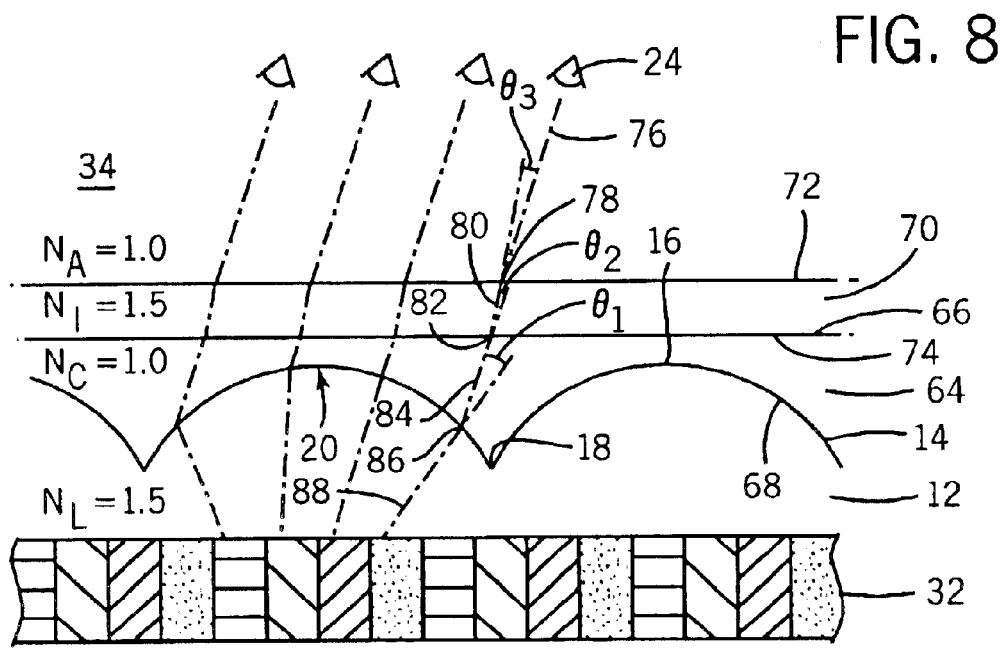
FIG. 8 is like FIG. 7 and shows a different viewing angle.

FIGS. 7 and 8 illustrate a further embodiment and use like reference numerals from above where appropriate to facilitate understanding. An optical medium adhesive 64 is provided on lenticular substrate 12. Adhesive layer 64 has a first surface 66, FIG. 8, facing toward observation area 34, and a second opposite surface 68 interfaced to peaks and valleys 16 and 18 of lenticular surface 14 of substrate 12. A laminate layer 70 is provided on adhesive layer 64 and has a first planar surface 72 facing observation area 34, and a second planar surface 74 interfaced and adhered to first surface 66 of adhesive layer 64. First and second planar surfaces 72 and 74 of laminate layer 70 are parallel to each other. Adhesive 64 has an index of refraction $N_C$ preferably 1.0 or at least substantially closer to $N_A$ than to $N_L$, i.e. substantially closer to 1.0 than to 1.5. Laminate layer 70 has an index of refraction $N_1$ which may be close to $N_L$ or may be the same thereas, namely 1.5. As illustrated in FIG. 8, light ray 76 entering laminate layer 70 at interface 78 bends toward the normal as shown at ray 80, because the light ray is entering a slower optical medium, namely the light ray is passing from an optical medium 34 having an index of refraction $N_A=1.0$ to an optical medium 70 having an index of refraction $N_1=1.5$. Light ray 80 continues and enters adhesive 64 at interface 82 and bends away from the normal as shown at ray 84, because the light ray is passing from a slower optical medium to a faster optical medium, namely from laminate 70 having an index of refraction $N_1=1.5$ to adhesive 64 having an index of refraction $N_C=1.0$. Light ray 84 continues and enters substrate 12 at interface 86 and bends toward the normal as shown at ray 88, because the light ray is passing from a faster optical medium into a slower optical medium, i.e. from adhesive 64 having an index of refraction $N_C=1.0$ to substrate 12 having an index of refraction $N_L=1.5$. The opposite return direction of the light ray follows the same path. Light rays passing from lenticular substrate 12 into adhesive 64 are bent at angle $\theta_1$ at the interface 86 thereof Light rays passing from adhesive 64 into laminate layer 70 are bent at angle $\theta_2$ at the interface 82 thereof. Light rays passing from laminate layer 70 into observation area 34 are bent at angle $\theta_3$ at the interface 78 thereof. $N_C$ is substantially closer to $N_A$ than to $N_L$, and $\theta_1$ is substantially greater than the difference between $\theta_3$ and $\theta_2$. Preferably $N_C=N_A$, and the difference between $\theta_3$ and $\theta_2$ is zero, i.e. $\theta_3=\theta_2$.

Figure 9:
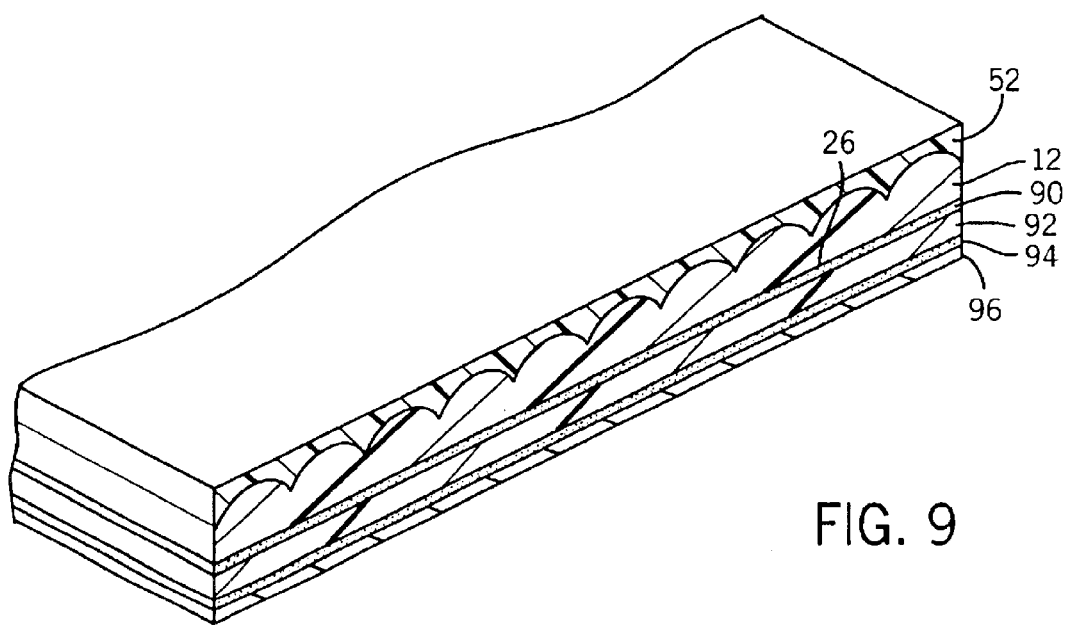
FIG. 9 is an enlarged perspective sectional view of another embodiment of a lenticular product in accordance with the invention.

FIG. 9 shows a further embodiment and uses like reference numerals from above where appropriate to facilitate understanding. The embodiment of FIG. 9 may desirably be used for graphic flooring applications to provide a protected lenticular floor graphic product. A mounting adhesive layer 90 is on second surface 26 of lenticular substrate 12. A flooring surface 92 is on adhesive layer 90. A pressure sensitive adhesive 94 is on flooring surface 92. A release liner 96 is removably adhered to pressure sensitive adhesive layer 94 and is removable to enable application to a floor. Substrate 12 may have coating layer 52 thereon as illustrated, or alternatively may have adhesive 64 and laminate layer 70 thereon. Coating layer 52 or laminate layer 70 are selected to provide the desired chemical and mechanical resistance, surface texture, and surface coefficient of friction (a high coefficient being desired for non-skid floor graphic applications). In non-floor applications, a smoother first surface 54 or 72 may be desired, including for subsequent printing or decorating.

The encapsulation and protection of the grooved lenticular surface of substrate 12 promotes the use of lenticular products in numerous applications where visual aesthetics or the irregular surface have prevented or discouraged their use heretofor. The functional aspects of the protective encapsulation, e.g. for chemical and/or mechanical abrasion resistance, also encourages numerous further extended uses. Examples include the above-noted floor graphics, credit cards, phone cards, gift cards, trading cards, greeting cards, signs, posters, labels, decals, book covers, decorative panels, name plates, and others.

It is recognized that various equivalents, alternatives and modifications are possible within the scope of the appended claims.

What is claimed is:

1. A protected lenticular product comprising a lenticular substrate having an index of refraction $N_L$, said substrate having a lenticular surface with a plurality of peaks and valleys forming a plurality of respective lenticule lenses, an optical medium on said lenticular surface, said medium having an index of refraction $N_C$, and having a first surface facing toward an observation area, and a second opposite surface interfaced to said peaks and valleys, said observation area having an index of refraction $N_A$, wherein $N_C$ is substantially less than $N_L$, wherein said second surface of said optical medium is a mirror image of said lenticular surface and conforms to said peaks and valleys of said lenticular surface, and said first surface of said optical medium is planar, such that said optical medium has thin portions at said peaks of said lenticular surface and has thick portions filling said valleys of said lenticular surface, wherein said optical medium is an adhesive, and comprising a laminate layer having a first planar surface facing said observation area, and a second planar surface interfaced and adhered to said first surface of said optical medium provided by said adhesive, said first and second planar surfaces of said laminate layer being parallel to each other, and wherein light rays passing from said lenticular substrate into said adhesive are bent at an angle $\theta_1$ at the interface thereof, light rays passing from said adhesive into said laminate layer are bent at an angle $\theta_2$ at the interface thereof, and light rays passing from said laminate layer into said observation area are bent at an area $\theta_3$ at the interface thereof, and wherein $N_C$ is substantially closer to $N_A$ than to $N_L$, and wherein $\theta_1$ is substantially greater than the difference between $\theta_3$ and $\theta_2$.

2. A protected lenticular floor graphic product comprising a lenticular substrate having an index of refraction $N_L$, said substrate having a first lenticular surface with a plurality of peaks and valleys forming a plurality of respective lenticule lenses, and a second opposite planar surface, an optical medium on said lenticular surface, said medium having an index of refraction $N_C$, and having a first surface facing toward an observation area, and a second opposite surface interfaced to said peaks and valleys, said observation area having an index of refraction $N_A$, wherein $N_C$ is substantially less than $N_L$, a mounting adhesive layer on said second surface of said lenticular substrate, a flooring surface on said adhesive layer, a pressure sensitive adhesive layer on said flooring surface, and a release liner removably adhered to said pressure sensitive adhesive layer and removable to enable application to a floor, wherein said second surface of said optical medium is a mirror image of said lenticular surface and conforms to said peaks and valleys of said lenticular surface, and said first surface of said optical medium is planar, such that said optical medium has thin portions at said peaks of said lenticular surface and has thick portions filling said valleys of said lenticular surface, said optical medium is a coating, and said first surface of said optical medium provided by said coating is interfaced to said observation area, and wherein light rays passing from said lenticular substrate into said coating are bent at an angle $\theta_1$ at the interface thereof, and wherein light rays passing from said coating into said observation area are bent at an angle $\theta_2$ at the interface thereof, and wherein $N_C$ is substantially closer to $N_A$ than to $N_L$ such that $\theta_1$ is substantially greater than $\theta_2$.

3. A protected lenticular floor graphic product comprising a lenticular substrate having an index of refraction $N_L$, said substrate having a first lenticular surface with a plurality of peaks and valleys forming a plurality of respective lenticule lenses, and a second opposite planar surface, an optical medium on said lenticular surface, said medium having an index of refraction $N_C$, and having a first surface facing toward an observation area, and a second opposite surface interfaced to said peaks and valleys, said observation area having an index of refraction $N_A$, wherein $N_C$ is substantially less than $N_L$, a mounting adhesive layer on said second surface of said lenticular substrate, a flooring surface on said adhesive layer, a pressure sensitive adhesive layer on said flooring surface, and a release liner removably adhered to said pressure sensitive adhesive layer and removable to enable application to a floor, wherein said second surface of said optical medium is a mirror image of said lenticular surface and conforms to said peaks and valleys of said lenticular surface, and said first surface of said optical medium is planar, such that said optical medium has thin portions at said peaks of said lenticular surface and has thick portions filling said valleys of said lenticular surface, said optical medium is an adhesive, and comprising a laminate layer having a first planar surface facing said observation area, and a second planar surface interfaced and adhered to said first surface of said optical medium provided by said adhesive, said first and second planar surfaces of said laminate layer being parallel to each other, and wherein light rays passing from said lenticular substrate into said adhesive are bent at an angle $\theta_1$ at the interface thereof, light rays passing from said adhesive into said laminate layer are bent at an angle $\theta_2$ at the interface thereof, and light rays passing from said laminate layer into said observation area are bent at an angle $\theta_3$ at the interface thereof, and wherein $N_C$ is substantially closer to $N_A$ than to $N_L$, and wherein $\theta_1$ is substantially greater than the difference between $\theta_3$ and $\theta_2$.

* * * * *